United States Patent [19]

Höpfner

[11] Patent Number: 4,634,221
[45] Date of Patent: Jan. 6, 1987

[54] FOCUSING MECHANISM
[75] Inventor: Clemens Höpfner, Stuttgart, Fed. Rep. of Germany
[73] Assignee: Eastman Kodak Company, Rochester, N.Y.
[21] Appl. No.: 605,747
[22] Filed: May 1, 1984
[30] Foreign Application Priority Data
Nov. 5, 1983 [DE] Fed. Rep. of Germany ....... 3340066
[51] Int. Cl.⁴ .............................................. G02B 7/04
[52] U.S. Cl. ................................... 350/255; 354/234.1
[58] Field of Search ............. 350/255; 354/230, 234.1, 354/400

[56] References Cited
U.S. PATENT DOCUMENTS
4,396,267 8/1983 Hirohata et al. .................... 354/195
4,504,132 3/1985 Martin et al. ..................... 354/234.1

FOREIGN PATENT DOCUMENTS
1101801 3/1961 Fed. Rep. of Germany .

Primary Examiner—John K. Corbin
Assistant Examiner—Loha Ben
Attorney, Agent, or Firm—Roger A. Fields

[57] ABSTRACT

In a camera or other photographic apparatus employing a movable lens, motion imparting means, such as a cam, has respective positions corresponding to infinity, close-up, and intermediate focus positions of the lens. The motion imparting means is rotatable uni-directionally about the optical axis of the lens from one of its corresponding positions successively to the other corresponding positions and back to the first position, for moving the lens bi-directionally along such axis between the infinity and close-up positions. Electromagnetically operated indexing means, such as a pawl and ratchet, is actuatable about the optical axis to rotate the motion imparting means in one direction only. The electromagnetic actuator for the indexing means is movable in opposite directions about the optical axis in accordance with the direction of current flow to the actuator, to actuate the indexing means and to reset itself. The resulting focusing mechanism is a relatively compact, simple unit.

12 Claims, 3 Drawing Figures

FOCUSING MECHANISM

CROSS REFERENCE TO A RELATED APPLICATION

Reference is made to commonly assigned, copending patent application Ser. No. 463,105, now U.S. Pat. No. 4,504,132, filed Feb. 2, 1983 in the names of William A. Martin and James K. Lee and entitled Multifunction Electromagnetic Actuator and Camera Control Apparatus Employing Same.

BACKGROUND OF THE INVENTION

1. Field of the Invention

The invention relates generally to photographic apparatus and more particularly to a focusing mechanism for a lens in a camera or a projector, for example.

2. Description of the Prior Art

Most cameras, except the fixed focus types, have some means of focusing—i.e., of setting the lens at the correct distance from the film to give a sharp image of the subject to be photographed. There are several ways of doing this; any one of them to be efficient must fulfill the following requirements: it must be free from backlash and play, and it must maintain the lens rigidly in a plane parallel with that of the film.

One recently devised focusing mechanism in a camera is disclosed in the patent application cross-referenced above. That mechanism is for a lens mounted for translation bi-directionally along its optical axis between an infinity focus position and a close-up (e.g., 3') focus position, and includes a cam ring having respective positions corresponding to the infinity and close-up positions of the lens. A compression spring urges the lens in a rearward direction along the optical axis, i.e., toward the infinity position, and holds a cam follower extending from the lens against an inclined cam surface on the cam ring. In operation, the cam ring must be rotated bi-directionally about the optical axis in order to translate the lens bi-directionally between its infinity and close-up positions. More specifically, rotation of the cam ring in a forward direction from its position corresponding to the infinity position of the lens to its other corresponding position will move the cam surface to translate the lens in a forward direction from its infinity position to its close-up position. Then, rotation of the cam ring in a reverse direction back to its initial position will permit the compression spring to translate the lens in the rearward direction back to its infinity position. An electromagnetic actuator for rotating the cam ring from its initial position to its other position includes a planar armature fixed to the cam ring for rotation with the cam ring about the optical axis. The armature has a flat coil located in a magnetic gap and is rotated in the forward direction about the optical axis, to rotate the cam ring to its other position, in response to current applied to the coil. Discontinuing current to the coil permits cantilever return springs to rotate the armature in the reverse direction about the optical axis, which rotates the cam ring back to its initial position.

While the focusing mechanism in the referenced patent application may operate satisfactorily, the amount of current applied to the coil for rotating the armature in the forward direction about the optical axis must be great enough to overcome the contrary urging of the cantilever return springs, as well as other forces that act to retard movement of the cam ring and the lens. Moreover, current must be continuously applied to the coil, against the contrary urging of the cantilever return springs, for as long as it is desired to hold the lens in its close-up position. Such an arrangement requires relatively large amounts of current, shortening the expected battery life and thereby necessitating a frequent change of batteries.

Another earlier devised focusing mechanism is disclosed in German Auslegeschrift No. 1101801, published Mar. 9, 1961. That mechanism includes two pawls which are electromagnetically actuated individually by closing separate switches. The two pawls engage respective ratchets, mounted for rotation coaxially with a worm gear. The worm gear is disposed in mesh with an elongate rack located along the barrel housing of a lens. The lens is mounted for translation along an optical axis that extends parallel to the rotational axis of the ratchets and the worm gear. Selective actuation of the pawls will cause the ratchets to rotate in opposite directions, thereby rotating the worm gear in such directions to translate the lens forward or rearward to respective focusing positions. This arrangement is perhaps better suited for focusing a lens in a slide projector, rather than in a camera, because of the considerable amount of space needed for the various components. Moreover, the mechanism requires two electromagnetic means, as well as two pawl and ratchet indexing means, which makes the mechanism relatively complex and expensive.

SUMMARY OF THE INVENTION

The above-described problems regarding prior art mechanisms for focusing a lens are believed solved by the invention. According to the invention, there is provided in a focusing mechanism for a lens mounted for movement bi-directionally between an infinity focus position and a close-up focus position, the improvement comprising:

motion imparting means having respective positions corresponding to the infinity and close-up positions of the lens and being mounted for movement uni-directionally from one of its positions to the other position and back to the first position for moving the lens in opposite directions between its infinity and close-up positions; and drive means for moving the motion imparting means uni-directionally from the first position to the other position and back to the first position.

Use of the motion imparting means movable in only one direction for moving the lens in opposite directions results in a relatively simplified, improved focusing mechanism which requires less electrical energy to operate, is less complex, and occupies less space in comparison to the prior art mechanisms described above. For example, with such an arrangement the need for a return spring for the lens as used in the referenced patent application is obviated. As a result, relatively less electrical energy is required to operate the focusing mechanism.

The motion imparting means in a preferred embodiment comprises cam means mounted for rotation uni-directionally about the optical axis of the lens. The cam means has respective cam surfaces corresponding to the infinity and close-up positions of the lens for moving the lens in opposite directions along the optical axis to its infinity and close-up positions in response to rotation of the cam means in only one direction. Respective plateau (idling) surfaces located on the cam means adjacent the respective cam surfaces correspond to the infinity and close-up positions of the lens for maintaining the lens in its infinity and close-up positions, immediately following movement of the lens to either one of such positions. An electromagnetically operated pawl and ratchet is mounted for actuation about the optical axis a selected member of times for rotating the cam means in one direction in increments to locate the lens in its infinity position or its close-up position. The electromagnetic means is mounted for movement in respective directions in accordance with the direction of current flow in such means to actuate the pawl and ratchet and to reset itself (without the use of a return spring).

BRIEF DESCRIPTION OF THE DRAWINGS

The invention will be described with respect to the drawings, wherein.

DESCRIPTION OF THE PREFERRED EMBODIMENT

The invention is described as being embodied in a still picture camera. Because such cameras are well known, this description is directed in particular to components of the camera forming part of or cooperating directly with the preferred embodiment. It is to be understood, however that components of the camera not specifically shown or described may take forms known to persons of ordinary skill in the related arts.

Figure 1:
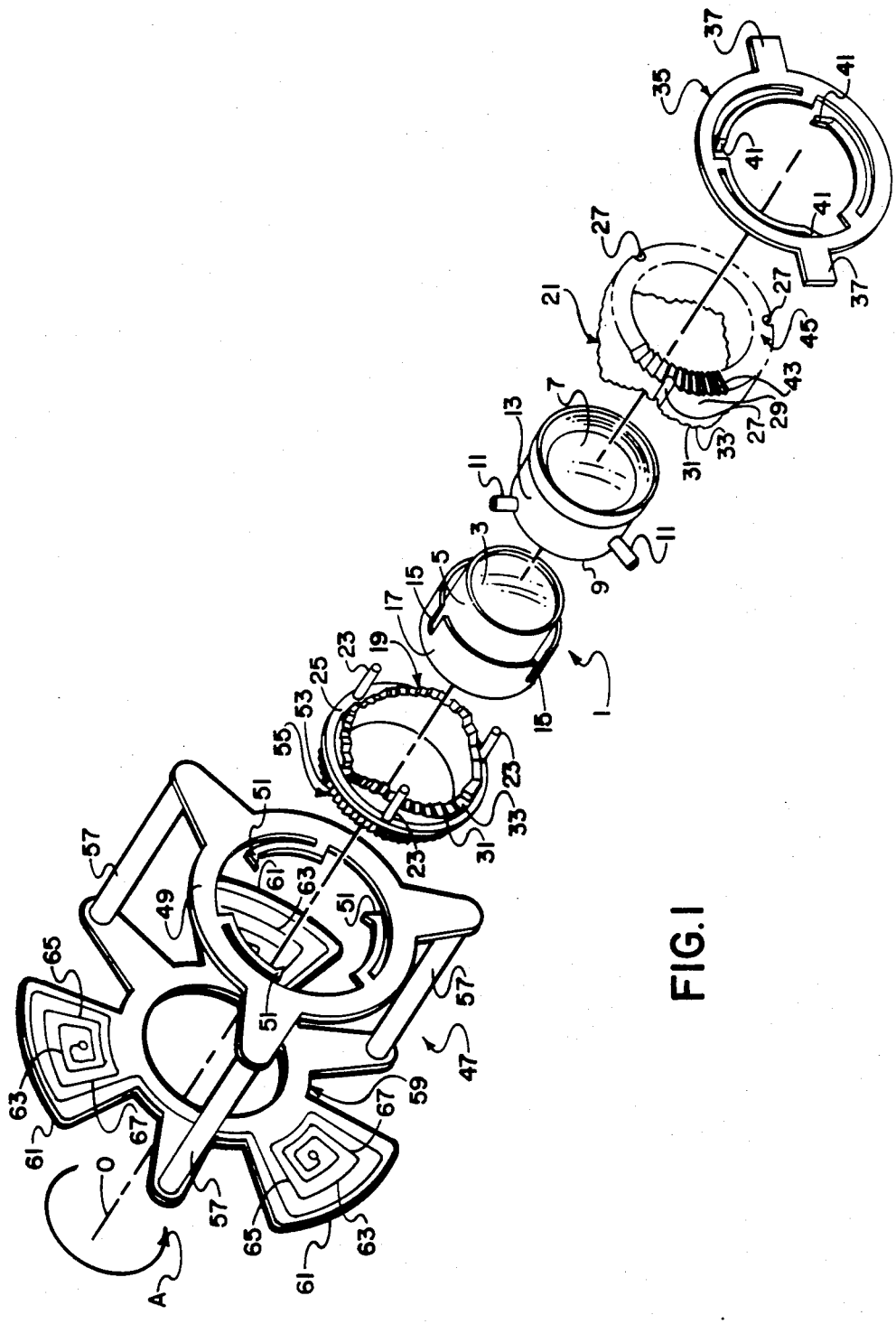
FIG. 1 is an exploded perspective view of the focusing mechanism, according to a preferred embodiment of the invention.

Referring now to the drawings, FIG. 1 is an exploded perspective view of a focusing mechanism according to a preferred embodiment of the invention. As shown, a front element focusing lens assembly 1 includes a rear lens element 3 supported in a fixed (stationary) mount 5 and a front lens element 7 supported in a movable mount 9. The movable mount 9 has three pins 11 equally spaced 120° apart on a circumferential wall 13 of such mount. The pins 11 extend transversely through respective slots 15 in a circumferential wall 17 of the fixed mount 5. This permits the front element 7 to be translated in opposite directions along an optical axis O of the lens toward and away from the rear element 3 to vary the focal length of the lens. As the axial separation between the rear and front elements 3 and 7 is increased, the focal length becomes shorter, permitting the lens to assume a close-up (e.g., 3') focus position. Conversely, as the axial separation between the rear and front elements 3 and 7 is decreased, the focal length becomes longer, permitting the lens to assume an infinity focus position.

A pair of parallel disposed stepping cam rings 19 and 21 are mounted for rotation about the optical axis O of the lens in the same direction, which is indicated as a counterclockwise direction by the arrow A in FIG. 1. The stepping cam ring 19 has three pins 23 equally spaced 120° apart on a circumferential flange 25 on such ring. The pins 23 extend into respective grooves 27 in a circumferential wall 29 in the stepping cam ring 21. This connects the cam rings 19 and 21 for rotation as a single entity in the direction A; although it permits the axial separation between the cam rings to be varied for a reason that is explained below.

Figure 2:
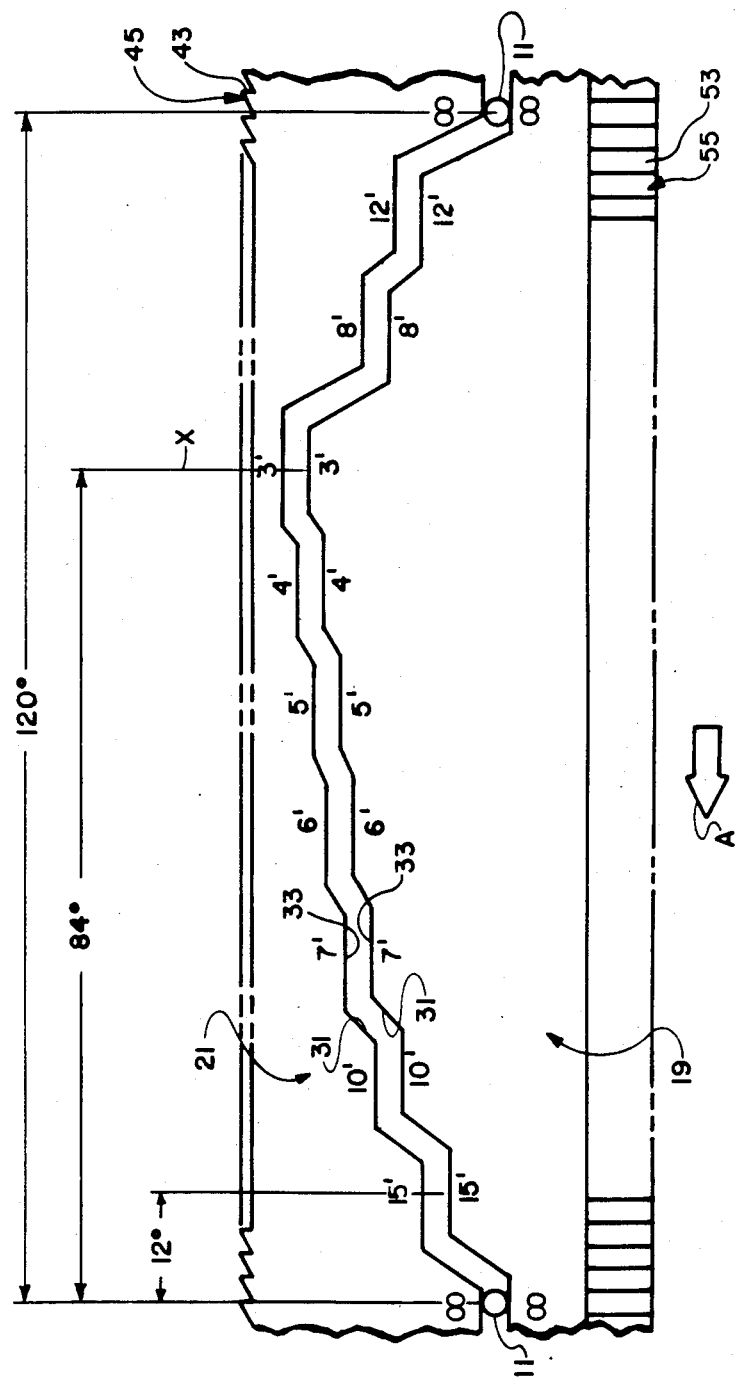
FIG. 2 is a partial sectional view of the cam means in the focusing mechanism, showing a profile of the cam and plateau surfaces.

Each of the stepping cam rings 19 and 21 has three successive, annular sets of alternating cam surfaces 31 and plateau surfaces 33. Since the cam rings 19 and 21 are disposed parallel to one another, the respective sets of alternating cam and plateau surfaces 31 and 33 on the cam rings are arranged in opposite facing relation, with the facing cam surfaces disposed parallel to one another and the facing plateau surfaces disposed parallel to one another. This is partially illustrated in FIG. 2, which shows one set of the cam and plateau surfaces 31 and 33 on the cam ring 19 and another set of such surfaces on the cam ring 21. Each of the sets of cam and plateau surfaces 31 and 33 consists of ten cam surfaces and ten plateau surfaces and occupies 120° on one of the cam rings 19 or 21, with the result that the individual rings have a continuous series of sixty alternating cam and plateau surfaces. The cam rings 19 and 21 are referred to as stepping cams because every two adjoining cam and plateau surfaces 31 and 33 on the individual rings constitute what may be termed a "step" (which occupies 12° on the individual rings, as shown in FIG. 2). In the preferred embodiment, there are ten such steps in each of the sets of cam and plateau surfaces, or thirty steps on each of the cam rings.

The three pins 11 extending from the front (movable) element 7 of the lens are located between respective pairs of the opposite facing sets of cam and plateau surfaces 31 and 33 on the stepping cam rings 19 and 21. Since the pins 11 are equally spaced 120° apart and each of the sets of cam and plateau surfaces 31 and 33 occupies 120° on one of the cam rings 19 or 21, the pins will successively contact the same pairs of parallel facing cam or plateau surfaces in the respective pairs of opposite facing sets of such surfaces as the cam rings are rotated about the optical axis O of the lens in the direction A. In this connection, there is provided a pawl ring 35 having two lugs 37 which are held stationary by suitable means, not shown, to prevent the pawl ring from rotating about the optical axis O. Three spring pawls 41 are arranged on the pawl ring 35 to engage respective ratchet teeth 43 of a ratchet ring 45, formed on an end face of the cam ring 21, and to urge that cam ring along the optical axis O toward the cam ring 19. The spring pawls 41 engage the ratchet teeth 43 to prevent the cam rings 19 and 21 from rotating about the optical axis O in a clockwise direction opposite to the direction A, as viewed in FIG. 1, and urge the cam ring 21 toward the cam ring 19 to sandwich the pins 11 on the front element 7 of the lens between the same pairs of parallel facing cam or plateau surfaces 31 or 33 in the respective pairs of opposite facing sets of such surfaces as the cam rings are rotated in the direction A. As indicated in FIG. 2, respective pairs of the parallel facing plateau surfaces 33 in each of the pairs of opposite facing sets of cam and plateau surfaces on the cam rings 19 and 21 correspond to various focus positions of the lens, i.e., ∞ (infinity), 15', 10', 7', 6', 5', 4', 3' (close-up), 8' and 12', for supporting the pins 11 to maintain the front (movable) element 7 of the lens in such focus positions. By the same token, the respective cam surfaces 31, located leftward of the line X in FIG. 2, in each of the sets on the cam ring 19 correspond to seven of the focus positions of the lens, i.e., 15', 10', 7', 6', 5', 4', and 3', for moving the pins 11 (which then act as cam followers) to translate the front element 7 of the lens in a forward direction along the optical axis O successively to such focus positions, in response to rotation of the cam rings 19 and 21 in 12° increments in the direction A. The cam rings 19 and 21 are initially rotated in the direction A from the same starting position. In that position, the pins 11 are located between the respective pairs of parallel facing plateau surfaces 33 corresponding to the infinity position of the lens. The respective cam surfaces 31, located rightward of the line X in FIG. 2, in each of the sets on the cam ring 21 correspond to the remaining three of the focus positions of the lens, i.e., 8', 12' and ∞, for moving the pins 11 to translate the front element 7 of the lens in a rearward direction along the optical axis O successively to such focus positions, in response to continued rotation of the cam rings in 12° increments in the direction A back to their starting position. Thus, the cam rings 19 and 21 must first be rotated 84° in the direction A to move the pins 11 to translate the front element 7 in a forward direction along the optical axis O from the infinity position to the close-up (3') position and must then be rotated 36° in the direction A to move the pins to translate the front element in a rearward direction along the optical axis from the close-up position back to the infinity position.

According to the preferred embodiment, therefore, rotation of the cam rings 19 and 21 uni-directionally translates the front element 7 of the lens bi-directionally between the infinity and close-up (3') focus positions and to the various intermediate focus positions. Moreover, the direction of movement of the front element 7 of the lens is reversed every time it is moved out of the close-up (3') position by the cam ring 21 and every time it is moved out of the infinity position by the cam ring 19. Thus, the cam ring 19 may be considered a forward motion imparting cam member and the cam ring 21 may be considered a reverse motion imparting member, with respect to the front element 7; although the two rings rotate in only one direction.

An electromagnetically operated pawl and ratchet indexing assembly 47 is mounted for actuation about the optical axis O of the lens a selected number of times for rotating the cam rings 19 and 21 in the direction A about the optical axis, in respective 12° increments, to locate the front (movable) element 7 of the lens in the various focus positions. As shown in FIG. 1, the indexing assembly 47 includes a pawl ring 49 supporting the circumferential flange 25 on the cam ring 19 and having three spring pawls 51, which are arranged on the pawl ring to engage respective ratchet teeth 53 equally spaced 12° apart on a ratchet ring 55. The ratchet ring 55 is formed on an end face of the cam ring 19. Three coupling rods 57 fix the pawl ring 49 in parallel relation to a planar armature 59 of an electromagnetic actuator for the spring pawls 51. The planar armature 59 is a known type, similar in many respects to the one disclosed in U.S. Pat. No. 4,396,267, and has three flat arms 61 constructed of an insulating material. Each of the flat arms 61 has a printed circuit coil 63 configured in a substantially rectangular shape, with two radial components 65 and 67 relative to the optical axis O arranged to lie in respective opposite magnetic fields defined by conventional means, not shown. The electromagnetic force that is exerted on the radial components 65 and 67 as current flows in the respective coils 63 act in a different direction in accordance with the direction of current flow in the coil to rotate the armature 59 about the optical axis O in the direction A or in a clockwise direction opposite to the direction A, as viewed in FIG. 1.

Rotation of the armature 59 in the direction A, similarly rotates the pawl ring 49 to cause the spring pawls 51 to engage respective ratchet teeth 53 on the ratchet ring 55 and thereby rotate the cam rings 19 and 21 in the direction A in 12° increments. Conversely, rotation of the armature 59 in the opposite direction, separates the spring pawls 51 from the engaged ratchet teeth 53 and positions them behind the next ratchet teeth to be engaged.

Operation

FIG. 3(a), (b), (c) and (d) is a schematic diagram illustrating the sequence of operation of the focusing mechanism, and shows the following: a pulse train comprising a series of voltage pulses of alternating opposite polarities, but having the same magnitude and duration; the angle of rotation of the armature 59; the angle of rotation of the cam rings 19 and 21; and the focus position of the front (movable) element 7 of the lens, respectively.

When a voltage pulse of a positive polarity is applied to the coils 63, the armature 59 is rotated 20° about the optical axis O in the direction A to similarly rotate the pawl ring 49. During the first 8° of rotation of the pawl ring 49 in the direction A, the spring pawls 51 are moved to engage respective ratchet teeth 53 on the ratchet ring 55. Then, for the remaining 12° of rotation of the pawl ring 49, the spring pawls 51 drive the ratchet ring 55 (in unison with rotation of the armature 59) to rotate the cam rings 19 and 21 the remaining 12°. The cam rings 19 and 21, in turn, act to translate the front element 7 of the lens along the optical axis O from one of its focus positions to the next focus position.

A voltage pulse of a negative polarity is applied to the coil 63, immediately after the positive pulse, to rotate the armature 59 and the pawl ring 49 jointly 20° about the optical axis O in a clockwise direction opposite to the direction A, as viewed in FIG. 1. This resets the armature 59 and the pawl ring 49, locating the spring pawls 51 about 8° behind the next ratchet teeth 53 to be engaged. Since the spring pawls 41 on the pawl ring 35 engage respective ratchet teeth 43 of the ratchet ring 45 on the cam ring 21 during this time, that cam ring and the cam ring 19 are prevented from rotating in the clockwise direction. Consequently, the front element 7 of the lens remains in its focus position.

Figure 3:
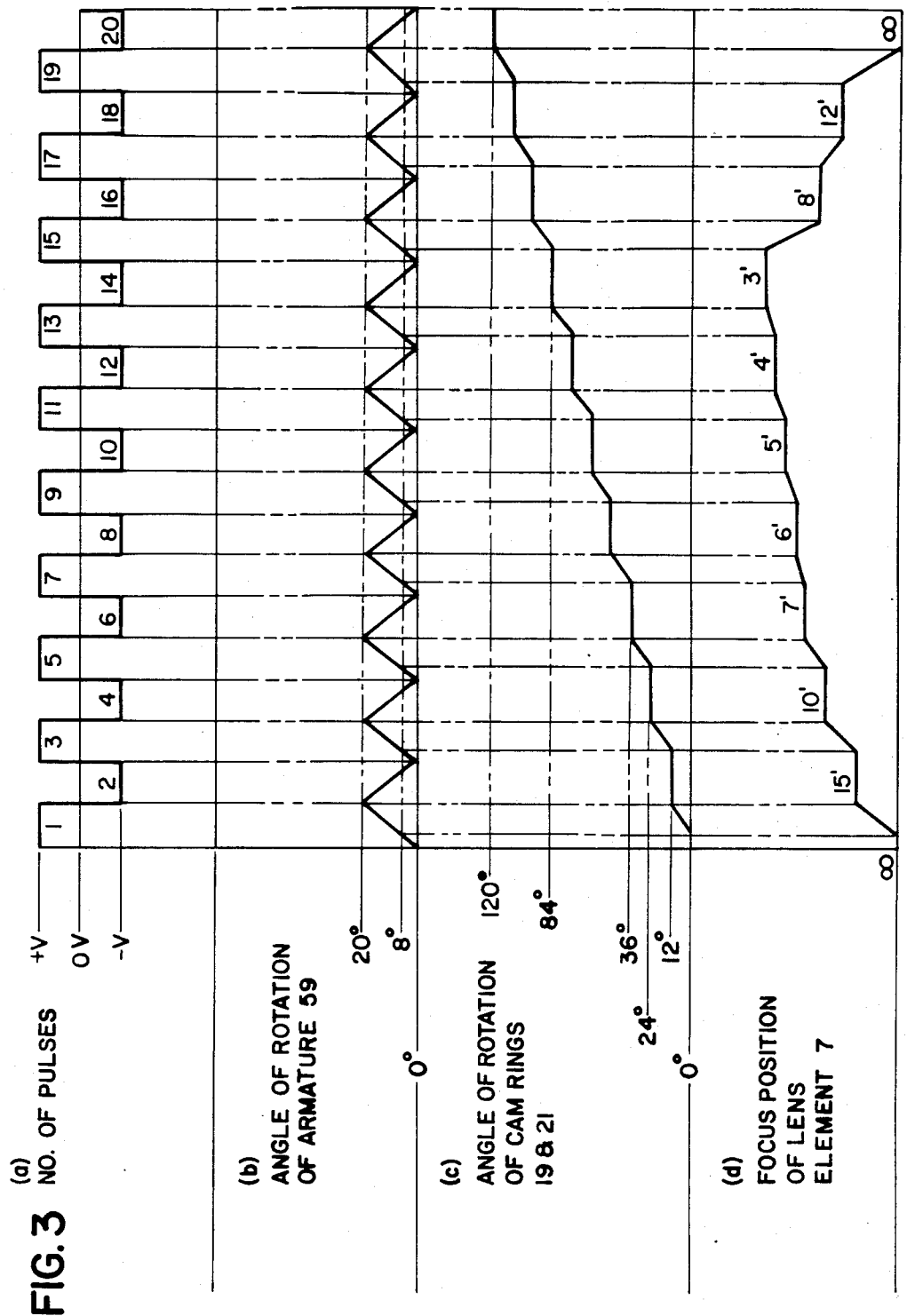
FIG. 3(a), (b), (c), and (d) is a schematic diagram illustrating the sequence of operation of the focusing mechanism.

The particular number of positive and negative pulses that are applied to the coils 63 determines the selected focus position of the front element 7 of the lens. Such number may be determined by conventional automatic focusing and control circuit means, not shown. Then, after a picture is taken, the voltage pulses are continued up to a maximum of twenty pulses, as indicated in FIG. 3, to return the front element 7 of the lens to a starting position, which in the preferred embodiment is the infinity position.

While the invention has been described with reference to a preferred embodiment, it will be understood that various modifications may be made within the ordinary skill in the art without departing from the scope of the invention. For example, a lens unit that is movable as a whole could be used instead of the front element focusing lens assembly 1 in which one of its elements, i.e., the front element 7, is movable. Moreover, the spring pawls 41 on the pawl ring 35 could engage respective ratchet teeth 53 on the ratchet ring 55, instead of engaging respective ratchet teeth 43 on the ratchet ring 45, to prevent the cam rings 19 and 21 from rotating in the clockwise direction opposite to the direction A in FIG. 1.

I claim:

1. In a focusing mechanism of the type for a lens mounted for movement bi-directionally between an infinity focus position and a close-up focus position, the improvement comprising:

motion imparting means having respective positions corresponding to the infinity and close-up positions of said lens and being mounted for movement uni-directionally from one of its positions to the other position and back to the first position for moving said lens between its infinity and close-up positions; and means for moving said motion imparting means uni-directionally from the first position to the other position and back to the first position.

2. In a focusing mechanism of the type for a lens mounted for movement bi-directionally between an infinity focus position and a close-up focus position, the improvement comprising:

cam means mounted for rotation uni-directionally and having respective cam surfaces corresponding to the infinity and close-up positions of said lens for moving said lens in opposite directions to its infinity and close-up positions in response to rotation of said cam means in one direction; and drive means for rotating said cam means uni-directionally to move said lens to its infinity and close-up positions.

3. The improvement as recited in claim 2, wherein said drive means includes pawl and ratchet indexing means mounted for actuation to rotate said cam means in one direction and electromagnetic means mounted for movement in respective directions in accordance with the direction of current flow in said electromagnetic means to actuate said indexing means and to reset itself.

4. The improvement as recited in claim 2, wherein said cam means has respective plateau surfaces located adjacent said respective cam surfaces and corresponding to the infinity and close-up positions of said lens for maintaining said lens in its infinity and close-up positions.

5. The improvement as recited in claim 4, wherein cam means includes a pair of oppositely facing cam members mounted for rotation uni-directionally and supporting said respective cam surfaces and said respective plateau surfaces, and said lens includes a cam follower extending between said cam members to contact said respective cam surfaces and said respective plateau surfaces.

6. The improvement as recited in claim 3, wherein said lens is mounted for movement along an optical axis, said cam means is mounted for rotation about the optical axis, and said pawl and ratchet indexing means is mounted for actuation about the optical axis.

7. In a focusing mechanism of the type for a lens mounted for movement bi-directionally along an optical axis between an infinity focus position and a close-up focus position and to at least one intermediate focus position, the improvement comprising:

motion imparting means having respective positions corresponding to the focus positions of said lens and being mounted for rotation uni-directionally about the optical axis from one of its positions successively to the other positions and back to the first position for moving said lens between its infinity and close-up positions;

drive means for rotating said motion imparting means uni-directionally from the first position to the other positions and back to the first position; and means for preventing backward rotation of said motion imparting means.

8. The improvement as recited in claim 7, wherein said drive means includes indexing means mounted for actuation about the optical axis a plurality of times for rotating said motion imparting means in increments corresponding to the respective positions of said motion imparting means.

9. The improvement as recited in claim 8, wherein said indexing means includes a ratchet connected to said motion imparting means for rotation with said motion imparting means about the optical axis and pawl means for rotating said ratchet in one direction only.

10. The improvement as recited in claim 7 or 9, wherein said motion imparting means includes two annular shaped cam members mounted for rotation in one direction about the optical axis and having discrete pairs of oppositely facing cam surfaces corresponding to the focus positions of said lens, respectively, and said lens includes a cam follower extending between said cam members to individually contact said pairs of cam surfaces.

11. In a focusing mechanism of the type for a lens mounted for movement bi-directionally along an optical axis between an infinity focus position and a close-up focus position and to at least one intermediate focus position, the improvement comprising:

motion imparting means having respective positions corresponding to the focus positions of said lens and being mounted for rotation uni-directionally about the optical axis from one of its positions to the other positions and back to the first position for moving said lens between its infinity and close-up positions;

ratchet means connected to said motion imparting means for rotation with said motion imparting means about the optical axis;

first pawl means engageable with said ratchet means for rotating said ratchet means in one direction to rotate said motion imparting means uni-directionally from the first position to the other positions and back to the first position; and second pawl means engageable with said ratchet means for preventing backward rotation of said ratchet means to prevent such rotation of said motion imparting means.

12. In a focusing mechanism of the type for a lens mounted for movement bi-directionally along an optical axis between an infinity focus position and a close-up focus position and to at least one intermediate focus position, the improvement comprising:

motion imparting means having respective positions corresponding to the focus positions of said lens and being mounted for rotation uni-directionally about the optical axis from one of its positions to the other positions and back to the first position for moving said lens between its infinity and close-up positions;

ratchet means fixed to said motion imparting means for rotation with said motion imparting means about the optical axis;

pawl means engageable with said ratchet means for rotating said ratchet means in one direction to rotate said motion imparting means uni-directionally from the first position to the other positions and back to the first position;

electromagnetic means mounted for rotation about the optical axis in respective directions in accordance with the direction of current flow in said electromagnetic means for engaging said pawl means with said ratchet means to rotate said ratchet means and for disengaging the two; and means for preventing backward rotation of said motion imparting means.

* * * * *